(12) United States Patent
Foix et al.

(10) Patent No.: US 11,826,683 B2
(45) Date of Patent: *Nov. 28, 2023

(54) MODULAR FILTRATION PLATFORM

(71) Applicant: ECOWATER SYSTEMS LLC, Woodbury, MN (US)

(72) Inventors: Lori Foix, Inver Grove Heights, MN (US); Michael J. Sherman, Woodbury, MN (US); Steve Wilson, Pine City, MN (US); James B. Larson, Stillwater, MN (US); Erik Klimpel, Woodbury, MN (US); Richard A. Kirchner, Apple Valley, MN (US); Chad Tousley, River Falls, WI (US); Steven J. Haehn, Oakdale, MN (US); Jeff Ehlers, Woodbury, MN (US)

(73) Assignee: ECOWATER SYSTEMS LLC, Woodbury, MN (US)

( * ) Notice: Subject to any disclaimer, the term of this patent is extended or adjusted under 35 U.S.C. 154(b) by 1 day.

This patent is subject to a terminal disclaimer.

(21) Appl. No.: 17/350,342

(22) Filed: Jun. 17, 2021

(65) Prior Publication Data
US 2021/0308607 A1    Oct. 7, 2021

Related U.S. Application Data

(60) Division of application No. 16/428,222, filed on May 31, 2019, now Pat. No. 11,077,392, which is a
(Continued)

(51) Int. Cl.
*B01D 35/30*      (2006.01)
*C02F 1/00*       (2023.01)
(Continued)

(52) U.S. Cl.
CPC .......... *B01D 35/301* (2013.01); *B01D 61/08* (2013.01); *C02F 9/20* (2023.01);
(Continued)

(58) Field of Classification Search
CPC ...... B01D 2201/302; B01D 2201/4015; B01D 2201/4023; B01D 2201/4076;
(Continued)

(56) References Cited

U.S. PATENT DOCUMENTS 5,141,637 A    8/1992  Reed et al.
5,407,571 A    4/1995  Rothwell
(Continued)

FOREIGN PATENT DOCUMENTS

EP    0870921 A2    10/1998
JP    2003251110 A   9/2003
(Continued)

*Primary Examiner* — Terry K Cecil
(74) *Attorney, Agent, or Firm* — DeLio Peterson & Curcio LLC; Brian G. Schlosser

(57) ABSTRACT

A modular filtration platform having at least one manifold head and at least one respective filter cartridge assembly. Each manifold head is connected to one another to establish a water flow in a series or parallel manner. Each filter cartridge assembly is releasably secured from rotation relative to the manifold head by a locking mechanism. An aperture on the filter cartridge assembly annular collar mates with a protruding resilient extension on either the manifold head or support bracket. Alternatively, an aperture on the filter cartridge assembly annular collar and an aperture on the manifold head annular collar mate with a protruding member from a locking ring extending through both apertures. An integrated sensor package may be integrated with the system for true managed water visible/audible indications and Wi-Fi interface to facilitate virtually instantaneous response times for filtration needs.

15 Claims, 15 Drawing Sheets

Related U.S. Application Data continuation of application No. 15/427,657, filed on Feb. 8, 2017, now Pat. No. 10,421,032.

(60) Provisional application No. 62/306,870, filed on Mar. 11, 2016.

(51) Int. Cl.

| | | |
|---|---|---|
| *B01D 61/08* | (2006.01) | |
| *C02F 9/20* | (2023.01) | |
| *C02F 1/28* | (2023.01) | |
| *C02F 1/44* | (2023.01) | |

(52) U.S. Cl.
CPC .......... *B01D 2201/302* (2013.01); *B01D 2201/4015* (2013.01); *B01D 2201/4023* (2013.01); *B01D 2201/4076* (2013.01); *B01D 2201/4092* (2013.01); *B01D 2201/56* (2013.01); *B01D 2313/02* (2013.01); *B01D 2313/06* (2013.01); *B01D 2313/13* (2013.01); *B01D 2313/21* (2013.01); *B01D 2313/44* (2013.01); *C02F 1/001* (2013.01); *C02F 1/283* (2013.01); *C02F 1/441* (2013.01); *C02F 2201/004* (2013.01); *C02F 2201/006* (2013.01); *C02F 2201/007* (2013.01); *C02F 2209/008* (2013.01); *C02F 2209/03* (2013.01); *C02F 2209/05* (2013.01); *C02F 2209/40* (2013.01)

(58) Field of Classification Search
CPC ........ B01D 2201/4092; B01D 2201/56; B01D 2313/02; B01D 2313/06; B01D 2313/13; B01D 2313/21; B01D 2313/44; B01D 35/301; B01D 61/08; C02F 1/001; C02F 1/283; C02F 1/441; C02F 2201/004; C02F 2201/006; C02F 2201/007; C02F 2209/008; C02F 2209/03; C02F 2209/05; C02F 2209/40; C02F 9/005

See application file for complete search history.

(56) References Cited

U.S. PATENT DOCUMENTS

| | | | |
|---|---|---|---|
| 6,402,798 B1 * | 6/2002 | Kallsen | B01D 46/24 55/504 |
| 7,067,054 B2 | 6/2006 | Fritze | |
| 7,294,262 B2 | 11/2007 | Tadlock | |
| 7,662,283 B2 * | 2/2010 | Eserkaln | C02F 9/005 210/232 |
| 7,673,756 B2 | 3/2010 | Levy et al. | |
| 7,981,289 B2 | 7/2011 | Tadlock | |
| 8,365,924 B2 | 2/2013 | Sokolchik et al. | |
| 9,061,225 B2 | 6/2015 | Sherman et al. | |
| 2003/0196947 A1 | 10/2003 | Gundrum et al. | |
| 2005/0045552 A1 | 3/2005 | Tadlock | |
| 2009/0236271 A1 | 9/2009 | Eserkaln | |
| 2009/0236277 A1 | 9/2009 | Kurth et al. | |
| 2009/0321340 A1 | 12/2009 | Rampen et al. | |
| 2011/0147298 A1 | 6/2011 | Kennedy | |
| 2011/0303543 A1 | 12/2011 | Fritze | |
| 2012/0298063 A1 | 11/2012 | Schieszl | |
| 2014/0008310 A1 | 1/2014 | Weston et al. | |
| 2014/0305086 A1 | 10/2014 | Sullivan | |
| 2015/0008173 A1 | 1/2015 | Shih-Ping | |

FOREIGN PATENT DOCUMENTS

| | | |
|---|---|---|
| KR | 10-1997-0009844 | 3/1997 |
| KR | 1020090078918 | 8/2009 |
| KR | 10-0944226 | 2/2010 |
| KR | 1020100065436 | 6/2010 |
| KR | 20110007147 | 1/2011 |
| KR | 10-2012-0064956 | 6/2012 |
| KR | 20140057941 | 5/2014 |

* cited by examiner

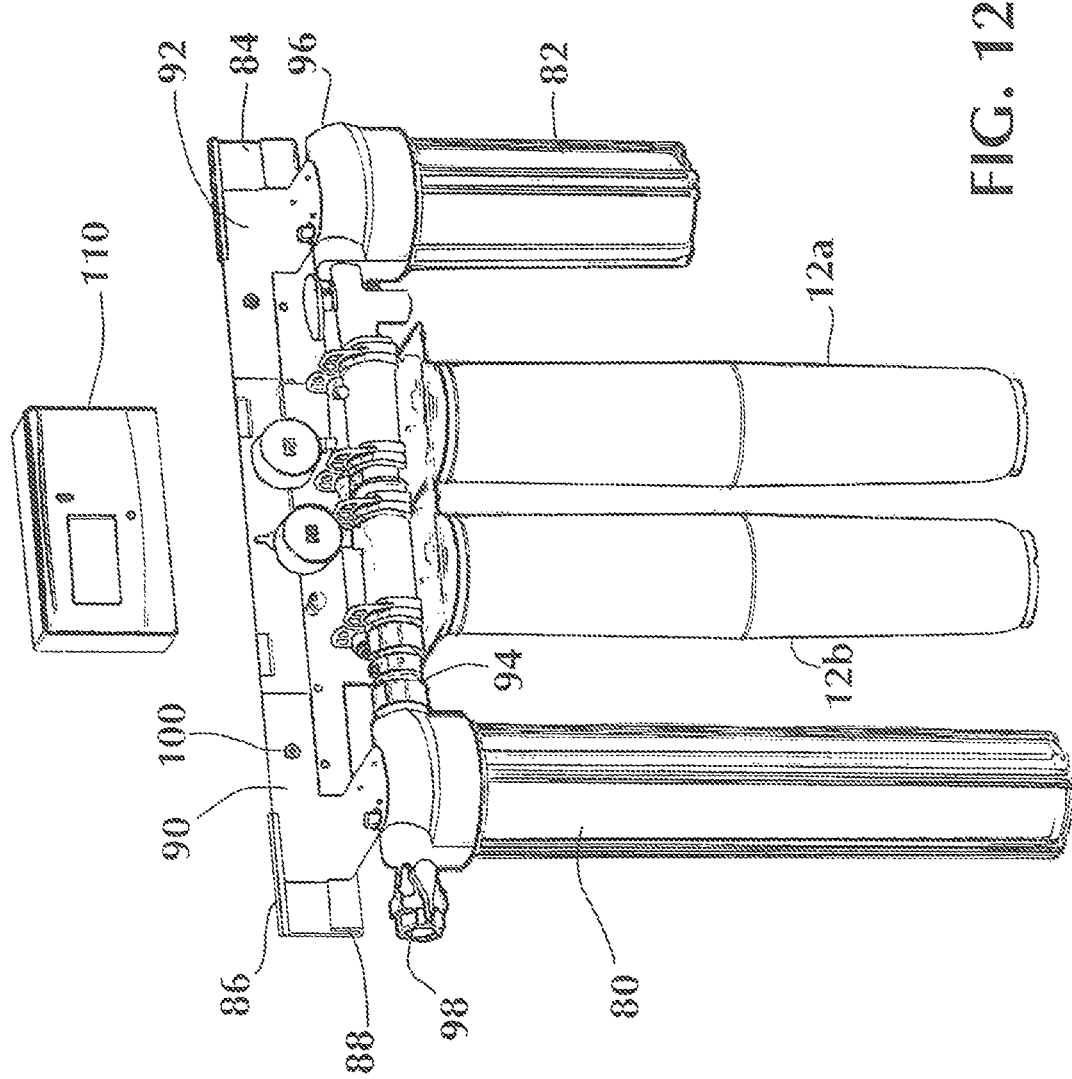

MODULAR FILTRATION PLATFORM

BACKGROUND OF THE INVENTION

1. Field of the Invention

The present invention relates to a water filtration system, and more specifically to a filtration platform having at least one, and preferably a plurality of, individual modules in fluid communication with one another for providing purified water. The modules may be connected to one another to establish a water flow through filter cartridges in a series or parallel manner. Each filter cartridge assembly is releasably attached to a manifold head by a locking mechanism.

2. Description of Related Art

Domestic purification of drinking water at the point-of-use is becoming increasingly important to many consumers. Water is usually purified to one extent or another by most municipalities prior to being supplied to consumers. Such municipal purification systems are, however, often inadequate and in any event incapable of removing many contaminants which adversely affect the taste of drinking water and which are introduced into drinking water between the municipal purification site and the domestic residences being serviced by the municipality.

Some of the existing problems in the art regarding filtration systems involve: a) filter replacement compliance; b) filter retention during operation (for example, not spinning off due to water pressure); c) modularity (simplifying the addition or removal of filtration components); and d) modification of the system's components to establish series or parallel flow to accommodate different filtration schemes.

There remains a demand in industry and in commercial and domestic settings for filter systems that can be used in diverse applications, and which can be assembled in modular form to achieve specific and specialized filtration needs. It is desirable for such filter systems to be adaptable for various filtering needs and filtering capacity. Furthermore, a filter system installed on a supply line will generally require routine maintenance for cartridge replacement and/or manifold repair. A modular system capable of detachment and reassembly would allow a user to perform replacement and/or repair without the need to remove the entire filter assembly.

Many applications require that more than one filter be employed to selectively remove different impurities. A filtration system may require the application of reverse osmosis membrane filters as well as other specialty filters that require pre-removal of contaminants, such as chlorine and/or sediment, in order to operate efficiently and properly. In such situations, some contaminants may first be removed from the feed water by passing the fluid through an upstream pre-filter before the fluid is fed into a filter array positioned downstream. The sequential treatment of fluids through multiple filters is known to have an effect on the quality of the filtered fluid as it passes through a filtering system. Both the number of filters and the type of filter media contained in the filters can affect the amount and type of contaminants removed from a treated fluid. Accordingly, it is desirable to provide a filtering system in which the number of individual filter cartridges, the type of filter media, and the particular configuration of the filtering system can be readily assembled and implemented in-line. It is noted, however, that the filter removal and replacement process often requires significantly more attention and work when the filtration system uses different types of filters for filtering different substances from the fluid or the fluids. Thus, a modular filtration system that can readily accommodate assembly/disassembly of various filter cartridges is desirable.

SUMMARY OF THE INVENTION

Bearing in mind the problems and deficiencies of the prior art, it is therefore an object of the present invention to provide a water purification system having a filter assembly which can be easily configured to accommodate different filtration schemes, including being configured for series or parallel flow.

It is another object of the present invention to provide a filter cartridge assembly attachment to a complementary manifold that ensures a locking feature to prevent unwarranted extraction of the filter cartridge assembly during use. Such a locking feature is advantageous on individual filter cartridge assemblies as well as a plurality of filter cartridge assemblies in a modular filter design.

It is another object of the present invention to provide a water purification system that includes an easily attachable/removable filter cartridge with a reliable and secure locking mechanism received by the manifold.

The above and other objects, which will be apparent to those skilled in the art, are achieved in the present invention which is directed to a modular filtration system comprising: at least one modular filter assembly having a manifold head and a filter cartridge assembly; the filter cartridge assembly including: a filter housing sealingly containing a filter media, the filter housing including an annular collar for mating to the manifold head, the annular collar having at least one aperture or recessed indent facing radially outwards, and adapted to receive a protrusion or lead-in tab for securing the filter cartridge from further rotation.

The modular filtration system further includes: a bracket for holding and/or supporting the manifold head and the filter cartridge assembly, the bracket having a forward end for receiving a push bar carriage, a back end mounting surface, and at least one support brace; and a push bar carriage slideably received by the at least one support brace, the push bar carriage having an aperture for receiving the annular collar of the filter cartridge assembly, the push bar carriage in resilient mechanical communication with the bracket such that an outward extraction force is applied to the push bar carriage when the push bar carriage is pushed inwards in the direction of the bracket back end mounting surface, the push bar carriage including the protrusion or lead-in tab such that the protrusion or lead-in tab is movably inserted within the at least one aperture or recessed indent of the annular collar thereby securing the filter cartridge assembly from further rotation when the outward extraction force acts on the push bar carriage.

The push bar carriage may include at least one inwardly, radially extending arcuate segment having a radius of curvature approximately equal to a radius of curvature for the annular collar.

The push bar carriage may further include a retainer for securing a resilient member, the resilient member producing the outward extraction force. The resilient member includes a spring.

The bracket includes a surface proximate the retainer for providing an opposing or withstanding force to the resilient member.

A protrusion or lead-in tab extends radially inwards of the push bar carriage aperture, and extends opposite the retainer.

The annular collar includes a recessed portion in a partial circumferential arcuate segment to facilitate insertion of the filter cartridge assembly into the manifold head, through the aperture of the push bar carriage, without requiring the user to simultaneously move the push bar carriage during insertion of the filter cartridge assembly.

The modular filtration system may include at least one sensor for monitoring fluid traversing through the system, the at least one sensor capable of measuring filtration fluid parameters such as flow rate, pressure, temperature, conductivity, and/or impurity concentrations. The at last one sensor may include an integrated sensor package which is integrated with the modular filtration platform system for managed water visible/audible indications and Wi-Fi interface.

In a second aspect, the present invention is directed to a filter cartridge assembly comprising: a filter housing sealingly containing a filter media; and an annular collar for mating to a manifold head, the annular collar having at least one indent or aperture facing radially outwards, and adapted to receive a movable protrusion for securing the filter cartridge assembly from further rotation when secured in the manifold head.

The annular collar includes a recessed portion in a partial circumferential arcuate segment to facilitate insertion of the filter cartridge assembly.

In a third aspect, the present invention is directed to a modular filtration system comprising: at least one modular filter assembly having a manifold head and a filter cartridge assembly; the filter cartridge assembly including: a filter housing sealingly containing a filter media, and having ingress and egress ports for fluid transfer, the filter housing including an annular collar for mating to the manifold head; a resilient protrusion or insertion segment extending radially outwards from the filter housing collar; the manifold head including an attachment base having a threaded annular collar, the manifold head having ingress and egress access ports in fluid communication with the filter housing ingress and egress ports, the manifold threaded annular collar having a receiving aperture which is in mechanical communication with the resilient protrusion or insertion segment of the filter housing collar when the filter cartridge assembly is secured to the manifold head, such that the filter cartridge assembly is locked in position by the resilient protrusion or insertion segment held in place by the receiving aperture; and a support bracket for mounting the at least one modular filter assembly.

The modular filtration platform system includes a locking clip attachable to the filter housing collar, the locking clip forming the resilient protrusion or insertion segment which extends radially from the filter housing collar for mating with the manifold threaded annular collar receiving aperture.

The locking clip has a predetermined radius and is attached circumferentially about the filter housing collar.

The resilient protrusion or insertion segment comprises an opposing resilient arcuate lock/release lever for extracting the resilient protrusion or insertion segment by a user. The resilient arcuate lock/release lever in its relaxed position extends radially beyond the radius of the locking clip, such that when the locking clip is secured to the filter housing collar, the resilient protrusion or insertion segment is aligned with the manifold threaded annular collar receiving aperture, and resiliency of the arcuate lock/release lever causes the resilient protrusion or insertion segment to extend through the manifold threaded annular collar receiving aperture.

In a fourth aspect, the present invention is directed to a modular filtration platform comprising: at least two modular filter assemblies, each having a manifold head and a filter cartridge assembly; the filter cartridge assembly including: a filter housing sealingly containing a filter media, the filter housing including an annular collar for mating to the manifold head, the annular collar having at least one aperture or recessed indent facing radially outwards, and adapted to receive a protrusion or lead-in tab for securing the filter cartridge from further rotation, wherein each of the manifold heads includes a top portion fluid access port releasably joined to an adjacent manifold head top portion fluid access port by a manifold union or conduit, which allows each manifold head to link in fluid communication to one another.

Each of the manifold heads include ingress and egress ports adapted for receiving either the manifold union or conduit to continue water flow outside the manifold head, or a conduit plug to cease water flow from a given port, or an input/output conduit for receiving fluid ingress or dispensing fluid egress.

The manifold union or conduit, the conduit plug, and the input/output conduit may be arranged on the manifold heads to allow fluid filtration in a series configuration or a parallel configuration.

The modular filtration platform further includes a locking key removably insertable within insertion holes located on the manifold head, such then when the manifold union or conduit is slideably inserted within an access port of the manifold head, the locking key placed within the insertion holes to secure the manifold union or conduit in place.

The manifold union or conduit includes spaced ribs to secure O-rings for a watertight seal of the manifold union or conduit to the manifold head.

The modular filtration platform may include a wall mount for securing the bracket to a permanent structure, the wall mount including at least one lip for slideably receiving a bracket flange capable of mounting a pre-filter assembly or a post-filter assembly to the modular filtration platform.

The pre- and post-filter assemblies are slideably positioned anywhere on the wall mount.

The top portion fluid access port slideably receives manifold union or conduits which fluidly connect one manifold head to another, and includes insertion holes for receiving a locking key, the locking key used to secure the manifold union or conduits to connect one manifold head to another in fluid communication.

The top portion fluid access port slideably receives a manifold union or conduit to continue water flow outside the manifold head, or a conduit plug to cease water flow from a given port, or an input/output conduit for receiving fluid ingress or dispensing fluid egress.

In a fifth aspect, the present invention is directed to a filter cartridge assembly including: a filter housing sealingly containing a filter cartridge, and having ingress and egress ports for fluid transfer, the filter housing including a threaded collar for mating to a manifold head; and a resilient protrusion or insertion segment extending radially from or through the filter housing collar for releasably securing the filter cartridge housing to the manifold head.

A locking clip is attachable to the filter housing collar, the locking clip forming the resilient protrusion or insertion segment which extends radially outwards from the filter housing collar for mating with a receiving aperture on the manifold.

The resilient protrusion or insertion segment comprises a resilient arcuate lock/release lever insertable within the manifold threaded annular collar receiving aperture, and the resilient arcuate lock/release lever in its relaxed position extends radially beyond the radius of the locking clip, such that when the locking clip is secured to the filter housing collar, the resilient protrusion or insertion segment is aligned with the manifold receiving aperture, and resiliency of the arcuate lock/release lever causes the resilient protrusion or insertion segment to extend through the manifold receiving aperture.

In a sixth aspect, the present invention is directed to a method for inserting a filter cartridge assembly to a manifold, comprising: aligning the filter cartridge assembly with a push bar carriage located on a supporting bracket, such that a recessed portion on an annular collar of the filter cartridge assembly aligns with a back curved portion of an aperture of the push bar carriage; inserting the filter cartridge assembly inserted vertically upwards into the push bar carriage aperture; rotating the filter cartridge assembly into a complementary receiving threaded portion of a manifold; aligning an aperture or recessed indent on the annular collar of the filter cartridge assembly upon rotation; and inserting a tab from the push bar carriage within the aperture or recessed indent on the annular collar of the filter cartridge assembly, the tab responsive to a resilient radially inwards force of the push bar carriage, to secure the filter cartridge assembly from further rotation.

In a seventh aspect, the present invention is directed to a method for extracting a filter cartridge assembly from a manifold, comprising: pushing a push bar carriage, which is slideably supported on a mounting bracket, inwards towards the filter cartridge assembly to displace a tab from within an aperture or recessed indent on an annular collar of the filter cartridge assembly; rotating the filter cartridge assembly in a rotational direction to remove the filter cartridge assembly from the manifold; releasing the push bar carriage; and removing the filter cartridge assembly.

BRIEF DESCRIPTION OF THE DRAWINGS

The features of the invention believed to be novel and the elements characteristic of the invention are set forth with particularity in the appended claims. The figures are for illustration purposes only and are not drawn to scale. The invention itself, however, both as to organization and method of operation, may best be understood by reference to the detailed description which follows taken in conjunction with the accompanying drawings in which:

FIG. 12 depicts two modular filter assemblies with a pre-filter assembly and a post-filter assembly attached thereto.

DESCRIPTION OF THE PREFERRED EMBODIMENT(S)

Figure 1:
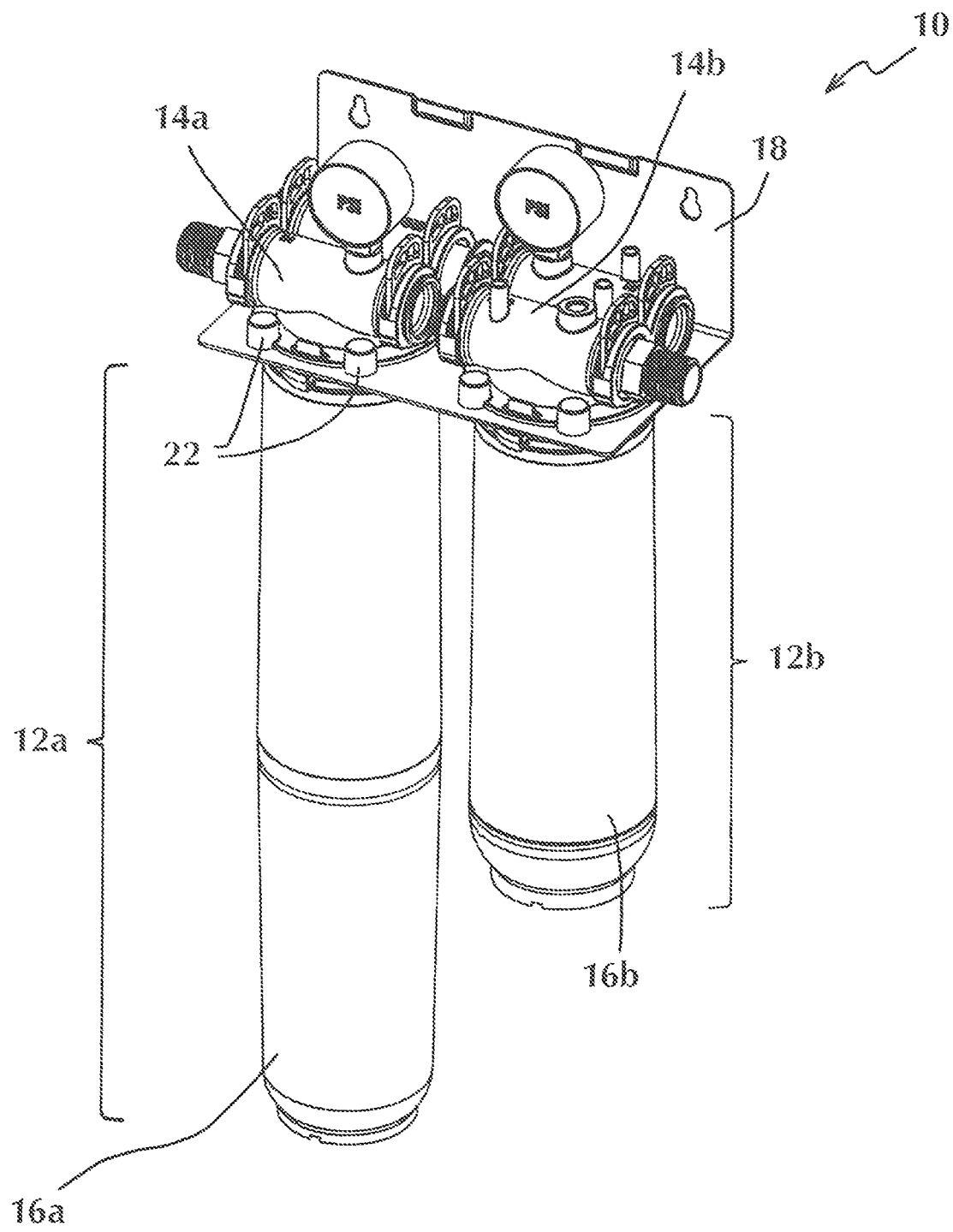
FIG. 1 depicts a perspective view of a base filtration reverse osmosis platform having two modular filter assemblies, each module having a manifold head with a first embodiment for an attachment.

In describing the preferred embodiment of the present invention, reference will be made herein to FIGS. 1-17 of the drawings in which like numerals refer to like features of the invention.

The present invention addresses the aforementioned problems associated in the art with different embodiments of a novel modular filtration platform. In accordance with one aspect of the invention, a drinking water purification system includes a base support or bracket, an ingress (input) port for a source of untreated water, an egress (outlet) port for providing purified water, and a modular filter assembly having an ingress port connected to the source of untreated water and an egress port connected to an outlet flow conduit or to a dispenser. The modular filter assembly may include individual manifold heads and attaching filter cartridge assemblies. Some or all of the manifold heads and/or filter cartridge assemblies may be interchangeable. Each manifold head is designed with fluid flow access ports to accommodate different fluid flow configurations, such as series and parallel fluid flow through the filter cartridge assemblies associated with each manifold, as will be discussed in further detail below. The manifold head includes a threaded attachment base for receiving a filter housing. A locking mechanism on the filter housing of the filter cartridge assembly is employed to mate with a complementary receiving locking mechanism on the manifold head in order to prevent inadvertent removal of the filter cartridge assembly.

The system is designed to filter water through filter cartridge assemblies connected to a set of manifolds. The system is modular with single manifolds capable of being daisy chained together as needed (i.e., a plurality of manifold/filter cartridge assemblies may be implemented). Modular manifolds allow customization and sizing to facilitate storage and equipment demand. A plurality of configurations is available, each with individual variants, enhancements, and extensions according to water quality, usage, and infrastructure. Most configurations would include a sediment pre-filter and an anti-scale post filter, although such additions are user optional.

The filtration platform may be flexible in design to be configurable and customizable to unique applications. For example, it may include a sensor package and state-of-the-art filter media, such as media from KX Technologies LLC, including carbon block, fibrillated activated carbon technology (FACT® Media), microbiological reduction chemistry, chloramine carbon, anti-scale treatments, and hybrids thereof.

The filter media is to a large extent, unrestricted, providing for media flexibility with options for municipal water, and specialty media for problem water and global water conditions.

An integrated sensor package may be integrated with the system for true managed water visible/audible indications and Wi-Fi interface to facilitate virtually instantaneous response times for filtration needs. An A/C power with battery backup may be used, although other power sources (DC options) are not restricted. The system may include some form of display, such as an LED display with status indicators, and a graphic user interface. In at least one embodiment, the system may be designed to be Wi-Fi enabled.

Strategies for such sensors include data collection measuring water flow and filtration time (life expectancy), which may implement flow meter, counters, pressure transducers, TDS monitoring, and the like.

The sensor measurements (such as flow measurements) may provide for optimized filter replacement, and ultimately managed costs. Flow and/or pressure signals are designed to signal when a filter change is necessary, which prevents downtime, and eliminates bypassing. At least one sensor may be employed with the filtration platform capable of measuring any number of filtration fluid parameters, such as flow rate, pressure, temperature, conductivity, and/or impurity concentrations, to name a few.

The sensor system may provide communication feedback to the user, owner/operator, and/or service network, such as texts, emails. This communication provides for timely filter replenishment and maintenance.

Each individual modular filter assembly includes a manifold head that is releasably joined to adjacent manifold heads by a manifold union or conduit(s), which allows each manifold head to link in fluid communication to one another. The manifold heads have ingress and egress ports adapted for receiving either a manifold union or conduit(s) to continue water flow outside the manifold head, or a plug to cease water flow from a given port, or provide treated water to a dispenser. As noted above, the conduits and plugs can be arranged to establish either parallel water flow or series water flow through filter cartridges in the filter housings attached to each manifold. In this manner, a plurality of filter cartridges are connected together in series or parallel for selectively removing specific kinds of impurities sequentially or simultaneously from, for example, a tap water supply, or for disinfecting incoming water, and/or for adding nutrients or other additives to the tap water supply.

In one embodiment of the present invention, a monitor system is utilized with sensors to measure the performance of the system. The monitor allows the user to receive and view the system performance. Communication, such as Wi-Fi capability, allows the data to be seen anywhere via smart phone, computer, etc.

The manifolds of an embodiment of the invention are modular, and connected together with conduits or unions which are in-turn held in place with retaining or locking clips, which allows the conduits or unions to be removably attached. The manifolds may be mounted on a bracket, preferably a solid bracket, such as a metal bracket, which is used to mount the entire filtration system at a needed location. The bracket preferably includes mounting holes for screws, nails, or the like, to mount the bracket to a wall or other support structure, such as to a wall mount bracket.

FIG. 1 depicts a perspective view of an exemplary embodiment of the present invention, specifically, a modular based filtration system. This system includes a base filtration platform 10 including two module filter assemblies 12a,b. Each module filter assembly includes a filter cartridge assembly 16a,b attached to a respective manifold head 14a,b. As will be evident in a more expansive modular design, triple and quad configurations, utilizing 3 or 4 filter cartridge assemblies, or configurations with more filter cartridge assemblies, are easily achievable from multiple assembled manifold/filter combinations.

Referring to FIG. 1, manifold heads 14a,b are shown attached to a supporting bracket 18. The filter cartridge assemblies include filter media enclosed within a watertight casing or housing. The filter media may be any filter media known in the art and generally used for water purification purposes, such as a carbon block filter media, filter paper, granulated activated carbon (GAC) media, or other combinations thereof, as examples. Additionally, the filter cartridge assembly may include a reverse osmosis membrane. In the embodiment identified by FIG. 1, filter cartridge assembly 16a represents a filter housing having filter media such as a carbon block, filter paper, GAC, or a combination thereof, and filter cartridge assembly 16b represents a reverse osmosis filter.

Figure 2:
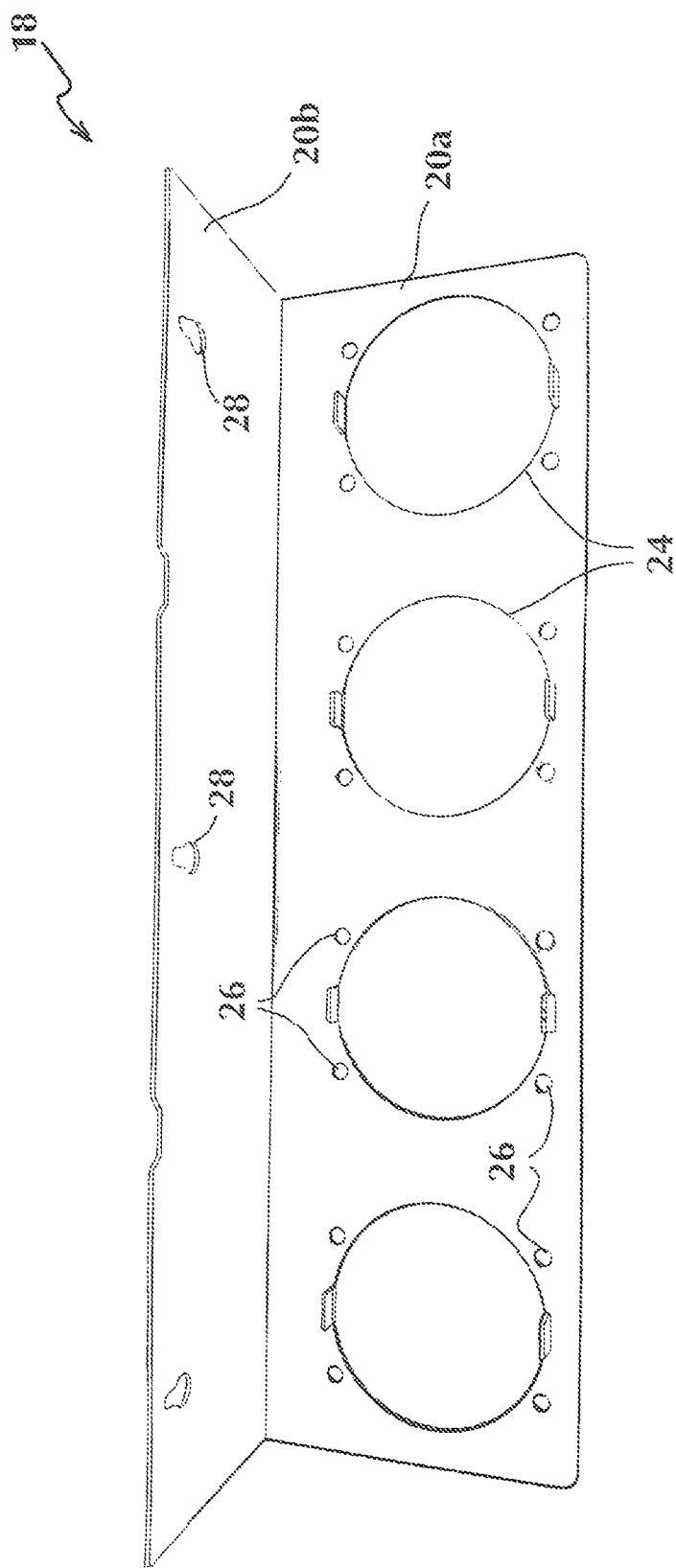
FIG. 2 depicts an exemplary embodiment of a supporting bracket of FIG. 1 to mount and hold a plurality of modular filter assemblies.

FIG. 2 depicts one embodiment of a supporting bracket to mount and hold a plurality of manifold heads. Bracket 18 is preferably an L-shaped structure having a horizontal portion 20a and vertical portion 20b. Mounting holes 24 are located in horizontal portion 20a, which are designed to receive the manifold heads 14a,b on the bracket upper side. As will be detailed below, manifold heads 14a,b include a threaded connector on its lower portion or bottom to receive an upper, complementary threaded portion of the filter housing of a filter cartridge assembly 16a,b. As depicted in FIG. 1, the top portion of the housing for each filter cartridge assembly 16a,b is insertably attached into the threaded connector on the lower portion of manifold heads 14a,b respectively, on the lower side of horizontal portion 20a of bracket 18.

Filter housings are attached to the manifold heads 12 the bottom portion of which extends through mounting apertures 24 in the bracket 18. Bracket 18 may contain alignment pegs or screw-hole apertures 26 to guide complementary locking attachments or screws or pegs 22 that secure manifold heads 14 to bracket 18. Bracket 18 is attachable to a wall or other mounting structure. Shown in this embodiment, bracket mounting screw holes 28 allow for bracket 18 to be physically secured to a mounting structure with commercial screws, bolts, or nails. Bracket 18 may be any shape which can support the respective manifold heads and filter cartridge housing assemblies, and is not limited simply to an L-shape configuration. By way of example only, bracket 18 in the illustrated embodiment is designed to accommodate a plurality of modular filter assembly mounting apertures 24 (two of which are needed in the embodiment depicted in FIG. 1) to hold multiple filter assemblies.

Figure 3:
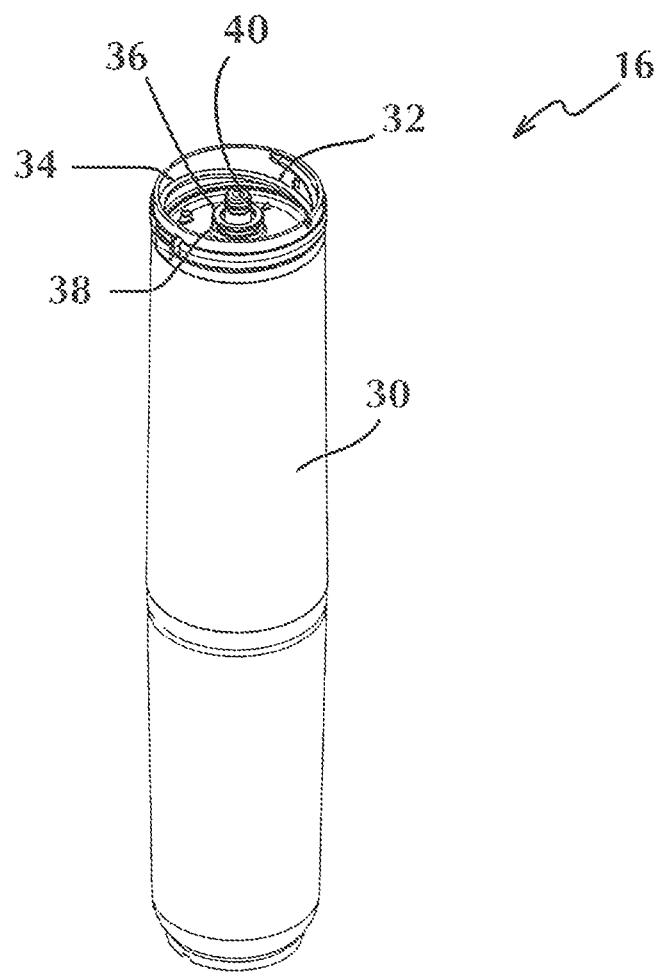
FIG. 3 depicts a perspective view of the filter cartridge assembly of FIG. 1.

FIG. 3 depicts a perspective view of filter cartridge assembly 16 (16a or b). The filter cartridge assembly includes a housing 30 having an annular collar 32 with preferably a double lead thread 34. An inner annular collar 36 is also shown which includes an O-ring 38 to provide a watertight seal. A connection fitting 40 is shown extending through the inner annular collar 36. Connection fitting 40 provides a fluid flow port for filter cartridge assembly 16a. In this embodiment, thread 34 is designed to accommodate a quick change of the filter housing from the manifold head preferably in about a ¼-turn, and includes a twist-click locking interface as will be discussed in further detail below.

Figure 4:
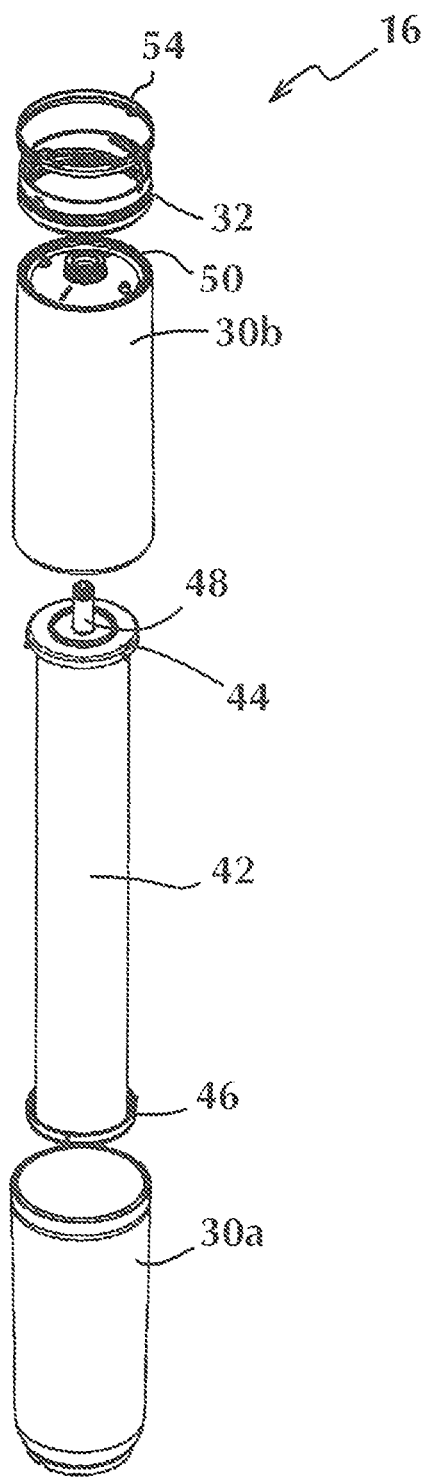
FIG. 4 depicts an exploded view of a filter cartridge assembly of one embodiment of the present invention.

FIG. 4 depicts an exploded view of a filter cartridge assembly 16 (16a or 16b) of one embodiment of the present invention. In this embodiment filter housing 30 is depicted as being constructed of two cylindrical shells 30a,b. Shell 30a receives filter cartridge 42, which in the illustrated embodiment is depicted as a carbon block filter media. Filter cartridge 42 is presented with a top end cap 44 and a bottom end cap 46. Filter cartridge 42 includes a center axial cylindrical fluid flow path or spacing, so that water flowing radially inwards from the outside wall of filter cartridge 42 exits the axial cylindrical spacing to a post or egress port 48 located on top end cap 44. Upon assembly, post or egress port 48 is inserted through aperture 50 at the top of filter housing shell 30b. Shells 30a,b when connected form a water-tight seal around filter cartridge 42. O-rings may be located about aperture 50 and/or egress port 48 to ensure water does not leak from the housing.

Bottom end cap 46 is sealed to filter cartridge 42 in order to obstruct fluid flow through the center axial cylindrical fluid flow path or spacing of filter cartridge 42, forcing fluid to flow radially inwards through the external wall of the filter cartridge cylinder in order for filtered water to exit the center axial cylindrical flow path.

The filter cartridge assemblies are designed with a threaded collar and accommodate a locking clip to attach securably to their respective manifold. Locking clip or ring 54 may be designed as a separate ring that is attachable to annular collar 32, or may be integrated with annular collar 32. This locking scheme is used to ensure filter retention during operation. In at least one embodiment, locking clip or ring 54 is installed around the outside of the filter annular collar 32. It is resilient to compression/extension and therefore "spring loaded" allowing a latch to be engaged automatically upon insertion of the annular collar into the complementary receiving manifold. That is, when the filter cartridge assembly is completely engaged with the manifold, a portion of locking ring 54 inserts into a corresponding slot in the manifold with an audible click. This locks the filter cartridge assembly into the manifold.

The resiliency of the locking ring allows a user to remove the filter cartridge assembly from the manifold by extending outwards the portion of the locking ring inserted within a slot in the manifold away from the slot, which allows for subsequent rotation of the filter cartridge assembly.

Figure 5A:
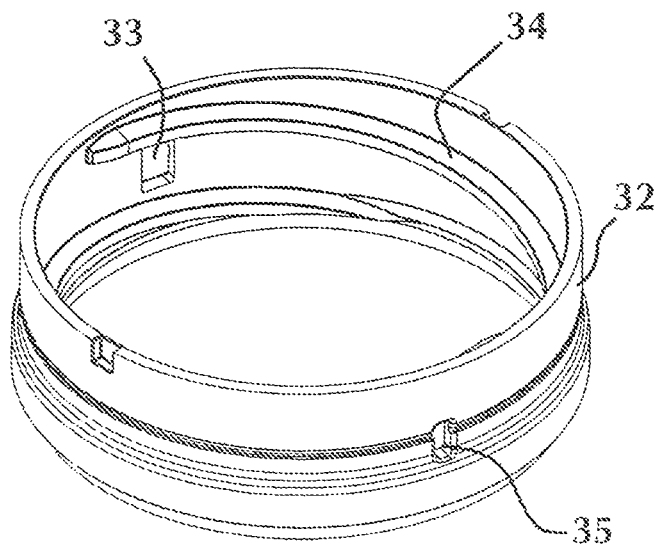
FIG. 5A depicts a perspective view of one embodiment of an annular collar, showing threaded attachment and apertures for insertion of a locking clip.

One embodiment of annular collar 32 is depicted in a perspective view in FIG. 5A. Receiving apertures or recessed indents 33, 35 are formed to receive an insertion segment 58 of locking ring 54, and an optional retainer segment 60, respectively. Receiving apertures 33, 35 are diametrically opposed about annular collar 32. The placement of insertion segment 58 and retainer segment 60 of locking ring 54 into receiving apertures 33, 35 axially secures locking ring 54 to annular collar 32 and prohibits any extended rotation of the locking ring or filter cartridge assembly.

Receiving aperture 35 receives retainer segment 60 of locking ring 54. This connection retains the locking ring from axial movement and prevents inadvertent rotation of the locking clip 54 when annular collar 32 is rotated within manifold head 14 (14a or 14b). Receiving aperture 33 receives insertion segment 58 of locking ring 54. This aperture also prevents inadvertent rotation of the locking clip 54 when rotated on annular collar 32. There is allowance for insertion segment 58 to move further inwards on receiving aperture 33 towards the axial center of annular collar 32 when filter cartridge assembly 16 (16a or 16b) is rotatably secured to manifold head 14 (14a or 14b).

Figure 5B:
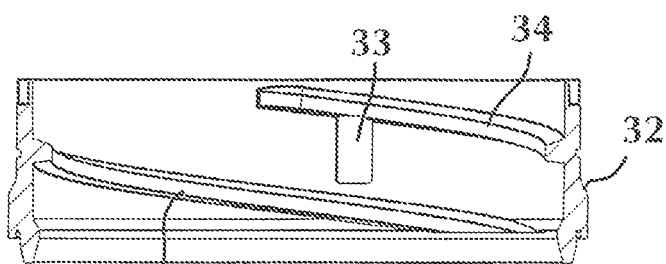
FIG. 5B depicts a cross-sectional view of the annular collar of FIG. 5A with a receiving aperture located between the internal threads.

FIG. 5B is a cross-sectional view of annular collar 32 depicting receiving aperture 33 located between threads 34.

Figure 5C:
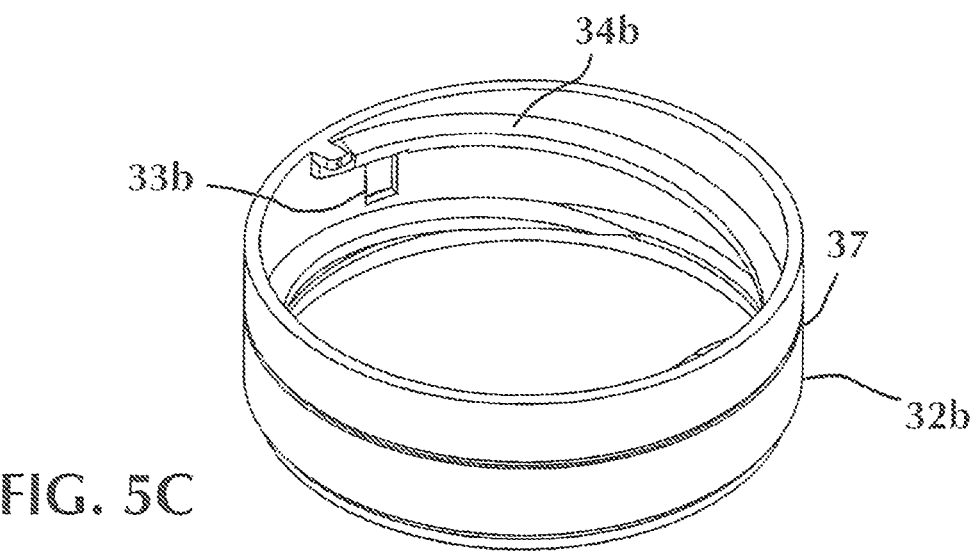
FIG. 5C depicts an annular collar having an outwardly extending circumferential lip which is formed on the outside surface of the annular collar, and which is designed to mate with a complementary groove on a locking ring to secure axially the locking ring.

In at least one embodiment, the design of annular collar 32 may have only receiving aperture 33 (not aperture 35) if it is accommodating a locking ring without a retainer segment 60. FIG. 5C depicts an annular collar having an outwardly extending circumferential lip (or conversely an inwardly extending groove) 37 which is formed on the outside surface of annular collar 32b, and which would mate with a complementary groove/lip on a locking ring to secure axially the locking ring. Additionally, annular collar 32 may include both receiving apertures 33, 35 and lip/groove 37 for securing the locking ring.

Figure 6A:
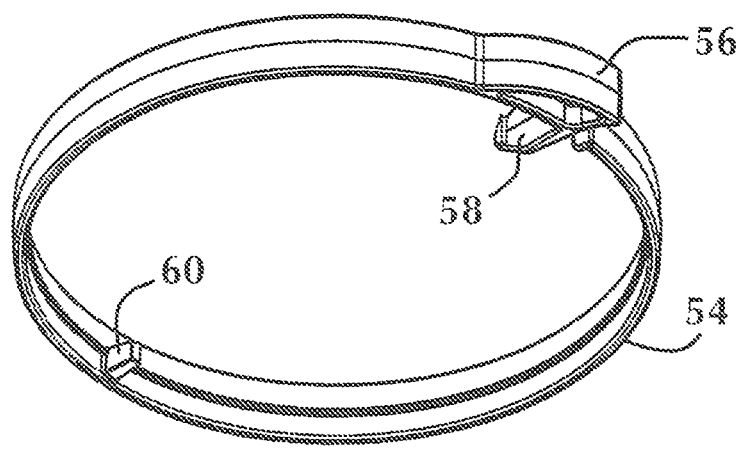
FIG. 6A depicts a perspective view of one embodiment of a locking clip for securing the annular collar of a filter cartridge assembly to a manifold.

FIG. 6A depicts a perspective view of one embodiment of locking clip 54. An insertion segment 58 is formed with and responsive to a resilient arcuate lock/release lever 56. Resilient arcuate lock/release lever 56 is preferably of the approximate radius of curvature of locking clip 54, although the design does not dictate that it must be of approximate curvature, and other lever shapes (other than arcuate) may be employed provided sufficient resiliency is exhibited for insertion and removal. In this manner, a user is able to activate the lever by pressing (pulling) radially inwards (outwards) towards (away from) the axial center of locking clip 54.

As depicted in FIG. 6A, resilient arcuate lock/release lever 56 in its relaxed position, extends radially beyond the radius of locking clip 54, such that when locking clip 54 is secured to annular collar 32, insertion segment 58 is aligned with receiving aperture 33 and the resiliency of lever 56 causes insertion segment 58 to extend through receiving aperture 33. In a similar fashion, when the filter cartridge assembly is attached to a manifold, insertion segment 58 extends through an aligned manifold aperture 73 to "lock" the filter cartridge assembly to the manifold, and prohibit unwanted rotation that could otherwise undermine the threaded attachment. The pulling of lever 56 radially outwards removes insertion segment 58 from the aligned manifold aperture 73, allowing a user to rotate and remove the filter cartridge assembly.

In at least one embodiment, the design of locking clip 54 may further include a groove (or lip) 59 for mating with outwardly extending circumferential lip (or inwardly extending groove) 37, which is formed on the outside surface of annular collar 32b, and which secures locking ring 54 axially. Additionally, locking ring 54 may include both retainer segment 60 and groove (or lip) 59 to secure attachment to the annular collar and prevent either axial or rotational movement when secured.

Figure 6B:
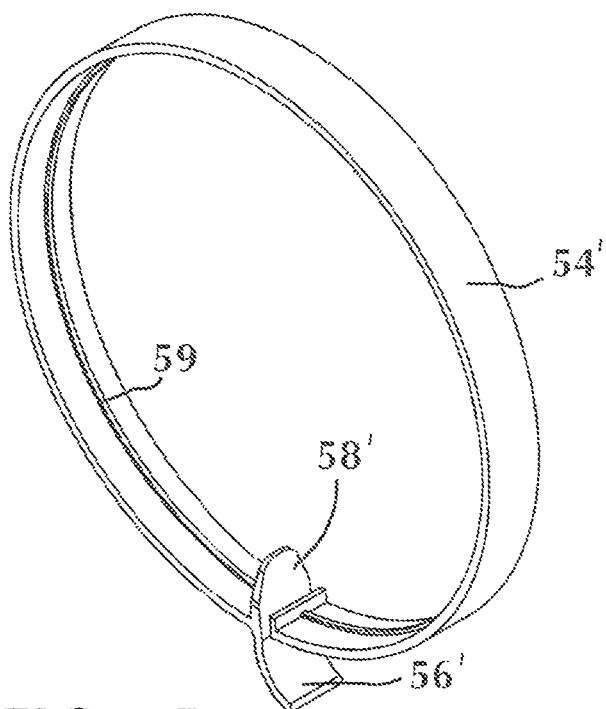
FIG. 6B depicts a second embodiment of a locking clip for securing the annular collar of a filter cartridge assembly to a manifold, where the locking clip includes a modified shaped insertion segment and release lever.

FIG. 6B depicts a second embodiment of the locking clip. In this embodiment, locking clip 54' includes a modified, shaped insertion segment 58' and release lever 56'. Locking clip 54' is depicted without retainer segment 60 (although retainer segment 60 may be employed if so desired, and if the manifold accommodates with an aligned manifold aperture). Insertion segment 58' acts in a similar fashion as insertion segment 58, when inserted within a receiving aperture of the annular collar.

Figure 6C:
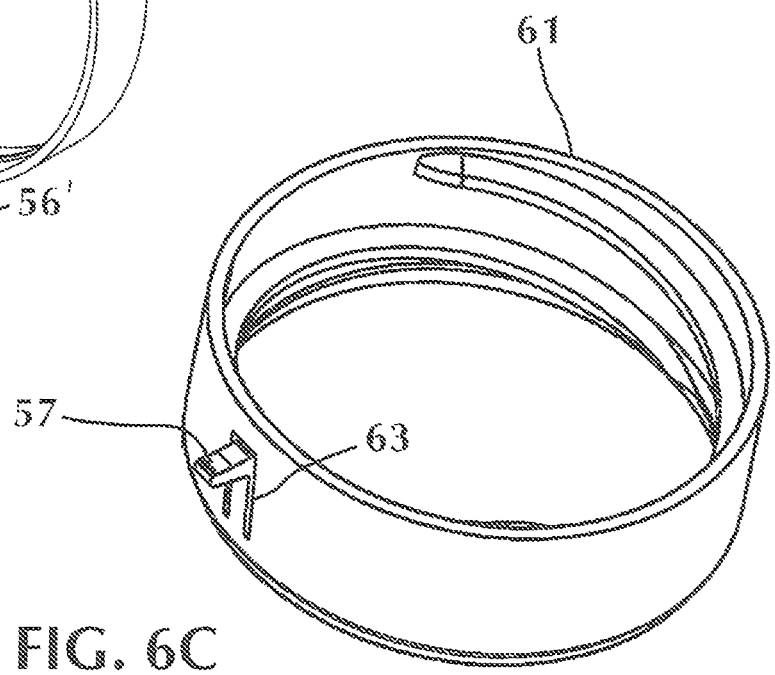
FIG. 6C depicts a third embodiment of a locking filter cartridge assembly that is employed without a locking clip.

FIG. 6C depicts a third embodiment of a locking filter cartridge assembly that is employed without the aforementioned locking clip. In this embodiment, the annular collar 61 of the filter cartridge assembly includes a recessible component 63 having a protrusion 57 which is capable of insertion within a receiving aperture on the manifold. In this embodiment, protrusion 57 is a resiliently formed section that is integral with annular collar 61, having only one side attached (formed with) annular collar 61.

Figure 7:
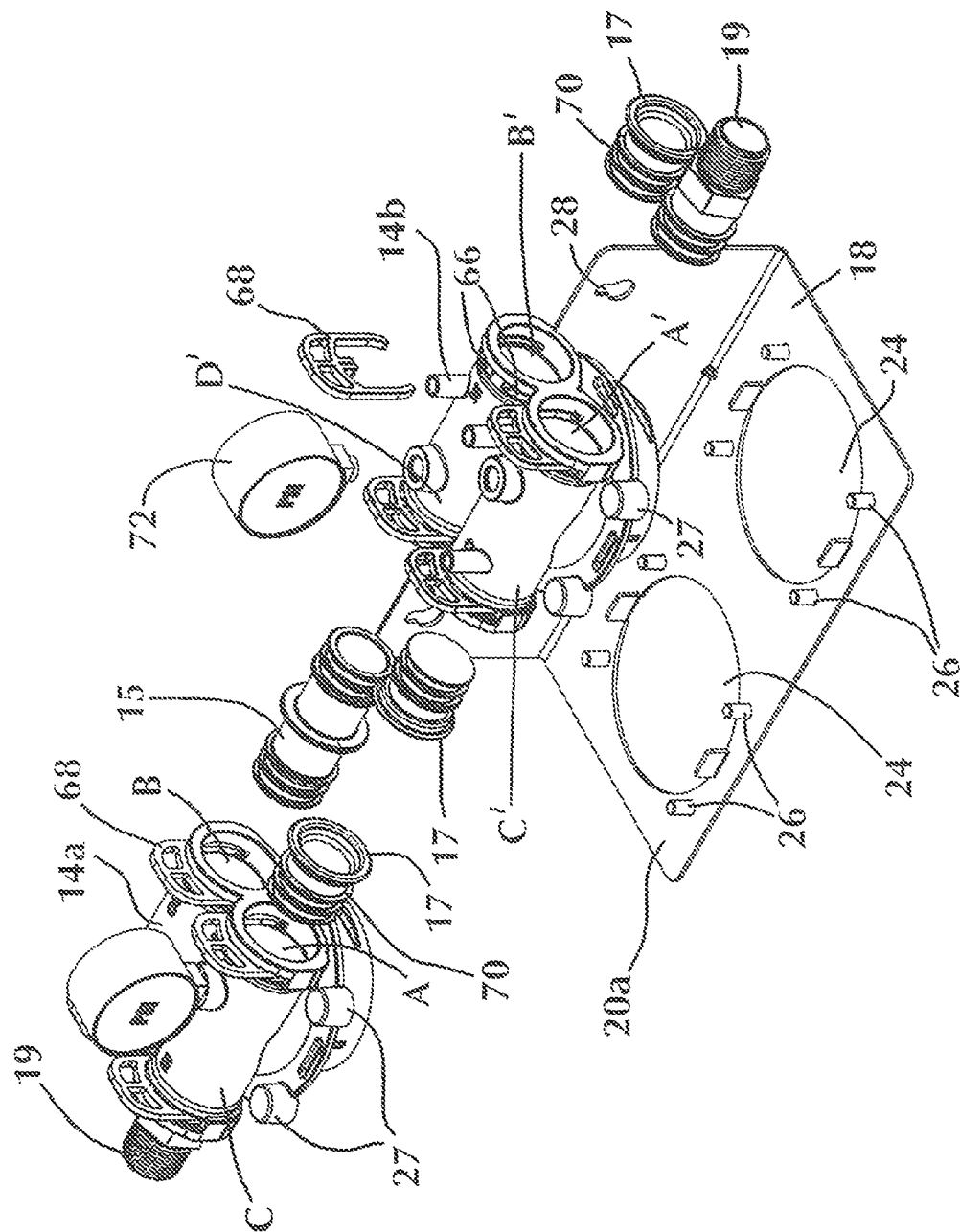
FIG. 7 depicts an exploded view of the dual manifold head construction of FIG. 1 with connecting conduits, manifold port plugs, and a supporting bracket shown.

FIG. 7 depicts an exploded view of a dual manifold head construction with connecting fluid flow conduits 15, manifold port plugs 17, threaded ingress/egress conduits 19, and a supporting bracket 18. Manifold heads 14a,b are shown with fluid flow access ports A-D (access port D not visible, but extending opposite access port B), and access ports A'-D' respectively. Each access port is capable of having fluid flow into or out of the manifold head. The manifold heads are arranged such that they are inserted within mounting apertures 24 of bracket 18. The threaded lower portion of each manifold head 14a,b being insertable through mounting apertures 24, while alignment pegs or screw-hole apertures 26 are used to secure the complementary mating attachment structure 22 of each manifold 14a,b.

Each manifold head is adapted to receive, and attach in a fluid-sealing manner with, a filter cartridge assembly 16 (16a,b). In particular, each manifold head includes a complementary connection fitting for mating with filter cartridge assembly 16 (16a,b).

Each access port A-D and A'-D' includes insertion holes 66 proximate each end for receiving and retaining a locking key 68. Locking key 68 is inserted within insertion holes 66 after either a fluid flow conduit 15, a manifold port plug 17, or a threaded ingress/egress conduit 19 has been inserted in access ports A-D or A'-D'. When fluid flow conduit 15, manifold port plug 17, or threaded ingress/egress conduit 19, is situated within a manifold access port (such as A, B, C, or D, etc.), locking key 68 secures the respective connector so that it cannot dislodge from the manifold access port without first removing locking key 68. Circumferential ribs 70, located on at least one end of the conduit, port plug, or ingress/egress conduit connectors secure O-ring seals for forming a watertight connection.

Pressure sensors 72 or other fluid flow monitoring devices as discussed previously above may be attached to the topside of the manifold, and exposed to the internal fluid flow through the manifold.

Figure 8:
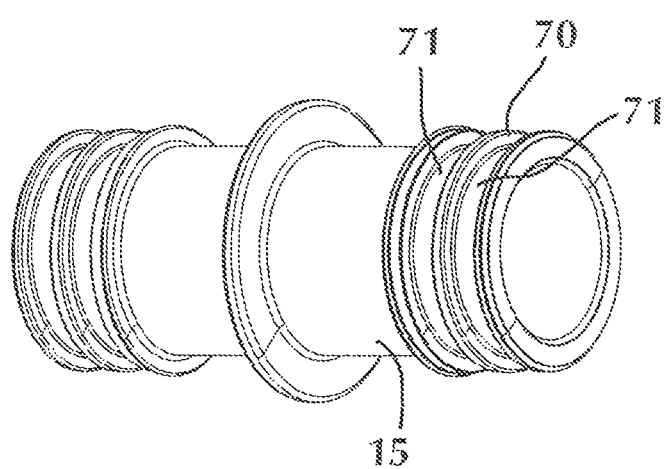
FIG. 8 depicts a conduit of FIG. 7 with circumferential ribs having gaps therebetween to receive the legs of a locking key.

FIG. 8 depicts conduit 15 with circumferential ribs 70 having gaps 71 therebetween that secure O-rings (not shown) for watertight insertion. Extended legs 69a-c of inserted locking key 68 retain conduit 15 from inadvertent removal from the manifold. As depicted in FIG. 7, locking key 68 includes two outside legs 69a,b that upon insertion extend through openings formed proximate each end of a manifold tubular segment that receives a fluid flow conduit 15, a manifold port plug 17, or a threaded ingress/egress conduit 19. A center leg extension 69c, which may encompass two smaller, closely spaced legs, may provide a further attachment mechanism at the top portion of the manifold tubular segment.

Figure 9:
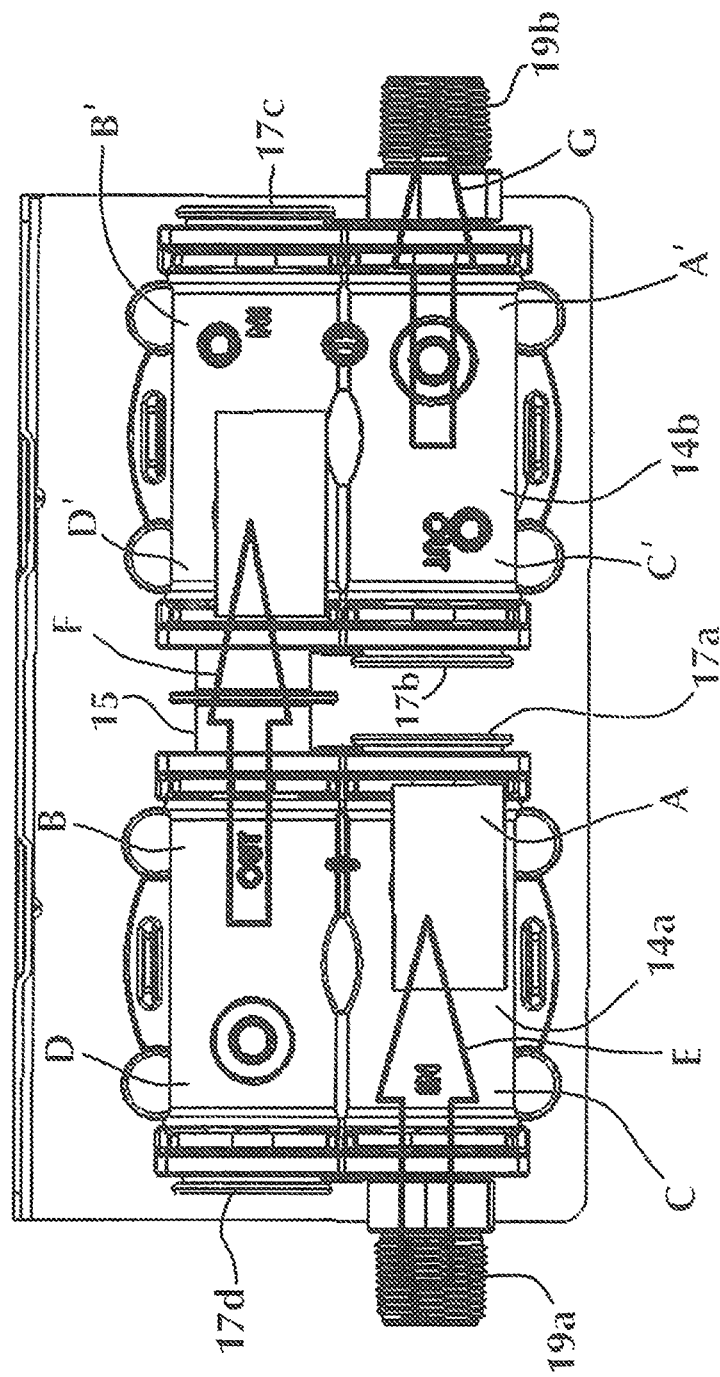
FIG. 9 depicts a top view of the manifolds of FIG. 7 indicating fluid flow for a series configuration.

FIG. 9 depicts a top view of the manifolds of FIG. 7 indicating fluid flow for a series configuration. In this configuration fluid enters the modular manifold assembly at ingress conduit 19 through access port A, as indicated by arrow E. Fluid then flows into the first filter cartridge assembly attached to manifold 14a, and upon exit from the filter cartridge is blocked by manifold port plug 17a and 17d from exiting manifold 14a in any direction other than through access port B. In this manner, fluid is directed through access port B, and exits through conduit 15, as indicated by arrow F. Fluid enters manifold 14b at access port D' and is directed to the filter cartridge assembly associated with manifold 14b. Manifold port plugs 17b, and 17c assist in directing fluid to travel out threaded egress conduit 19b, as indicated by arrow G, insomuch as the plugs do not allow fluid to exit a conduit through a stopped access port. In accordance with this configuration, fluid is directed first through the filter cartridge assembly attached to manifold 14a, and then sequentially through the filter cartridge assembly attached to manifold 14b. Thus, a series configuration for filtration is achieved. In a similar fashion, the manifolds may be configured with a set of conduits and plugs to provide for parallel flow through the filter cartridge assemblies, such that fluid enters each filter cartridge simultaneously, that is, each filter receives unfiltered fluid (not previously filtered by another filter in the parallel flow path) and simultaneously provides filtered fluid to the exit or egress port of the modular manifold arrangement.

Figure 10:
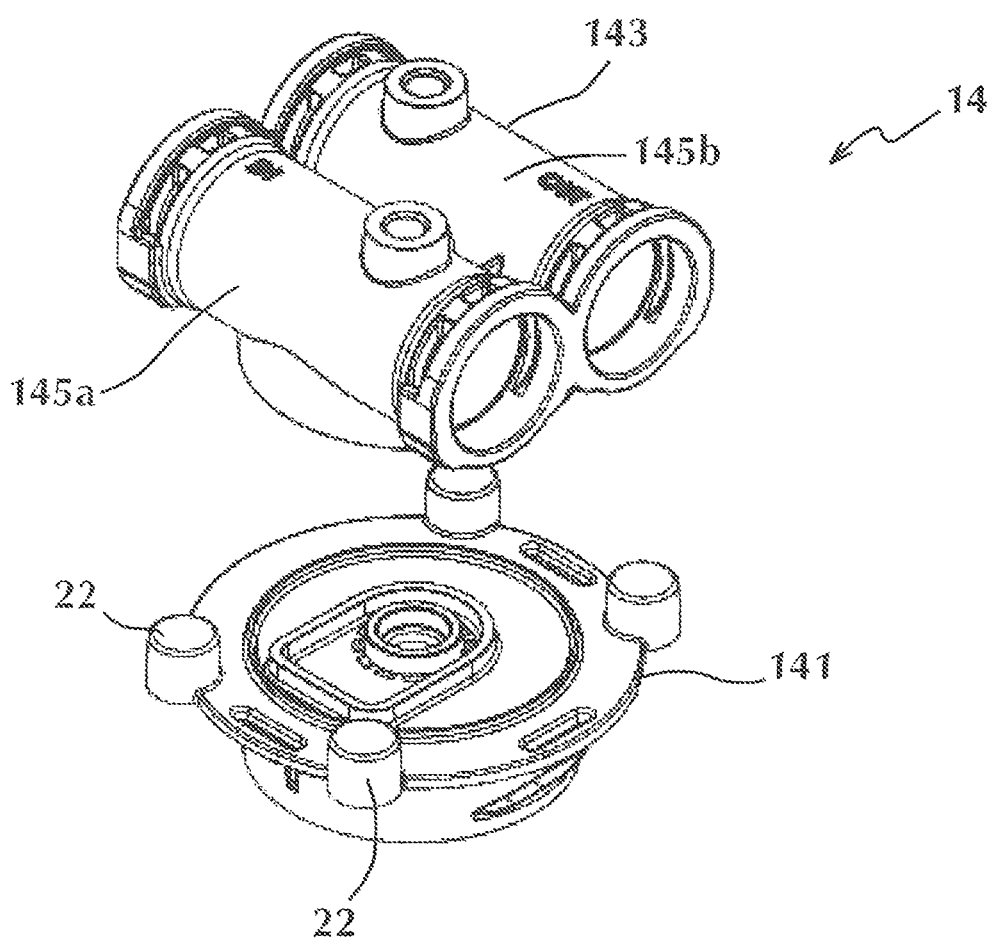
FIG. 10 depicts an exploded view of one embodiment of a manifold head of the present invention.

FIG. 10 depicts an exploded view of one embodiment of a manifold head 14 of the present invention. The manifold head 14 comprises at least two parts, a base section 141 and a cylindrical conduit attachment section 143. Base section 141 is preferably of molded construction, although other constructions are not limited by the present design. Base section 141 includes locking attachments or screws or pegs 22 that enable manifold 14 to be secured to bracket 18. As indicated in FIG. 10, locking attachments 22 are depicted molded to base section 141; however, other attachment schemes known in the art may be employed, and the present invention is not limited to any particular attachment scheme. Conduit attachment section 143 includes two fluidly separate ingress/egress subassemblies 145a,b to direct fluid that flows into the manifold toward a filter cartridge assembly, receives fluid from the filter cartridge assembly, and redirects the filtered fluid out of the manifold. As depicted, these conduit attachment sections are cylindrical in shape, having apertures located proximate the end portions for receiving a locking key.

Figure 11A:
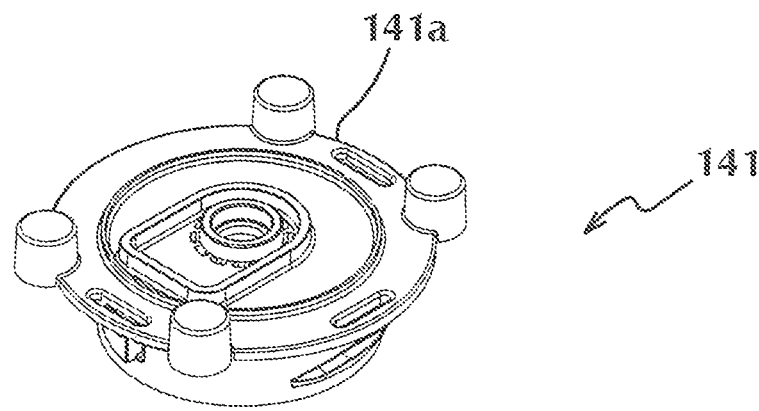
FIGS. 11A-C depicts different perspective views of the base section of the manifold of FIG. 10, showing a top perspective view, a bottom perspective view, and a reversed, bottom perspective view.
Figure 11B:
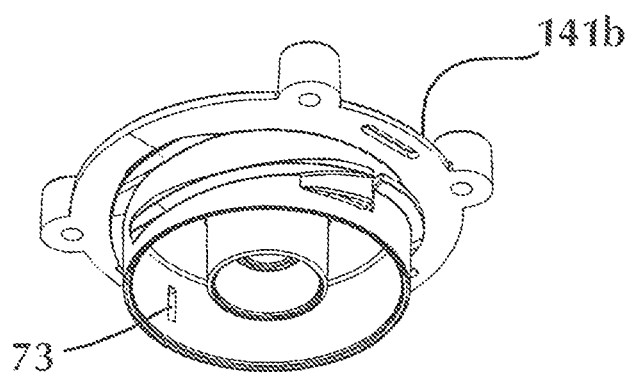
Figure 11C:
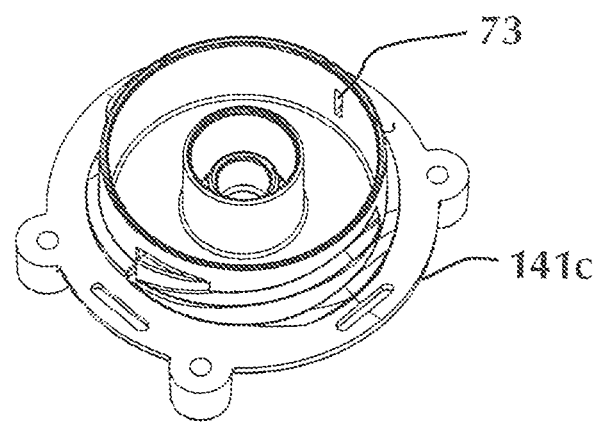

FIGS. 11A-C depicts different perspective views of base section 141 of manifold 14. A top perspective view 141a, a bottom perspective view 141b, and a reversed, bottom perspective view 141c. In the latter two views, manifold aperture 73 is visible. This aperture receives insertion segment 58 of locking ring 54.

FIG. 12 depicts an illustrative embodiment of two modular filter assemblies 12a,b with a pre-filter assembly 80 and a post-filter assembly 82 attached thereto. Bracket 18 is shown attached to a wall mount 84. Wall mount 84 includes a top lip 86 and a bottom lip 88 for slideably receiving a bracket flange 90 which mounts pre-filter assembly 80 to bracket 18, putting pre-filter 80 in line for attaching a threaded conduit 94 to the modular filter assembly 12b. Bracket flange 92 mounts post-filter assembly 82 to bracket 18, putting post-filter 82 in line for attaching a threaded conduit to the modular filter assembly 12a. Each pre- and post-filter assembly includes a manifold head having ingress and egress ports to receive a threaded conduit 94, plug 96, or threaded fluid flow port 98, as the configuration requires. Bracket flange 90, 92 are slideably engaged to the lips 86, 88 of bracket 18, for a secure mounting.

This configuration allows pre- and post-filter assemblies to be added after installation of the dual modular filter assemblies. Pre- and post-filter assemblies 80, 82 may be positioned anywhere on the wall mount 84. A thumb screw 100 may be employed to hold their position.

As noted previously, the sensor system employed with the modular filtration platform may provide electronic feedback to the user/operator. Wi-Fi capability which allows computers, smartphones, or other devices to connect to the Internet or communicate with one another wirelessly within a particular area may be used to relay critical filtration information. FIG. 12 depicts a communication module 110 that is capable of communicating with the sensors employed with the modular filtration platform, and is also capable of communicating with other electronic devices. In this embodiment, at least some of the sensors employed with the modular filtration platform have wireless communication ability.

Figures 13, 14:
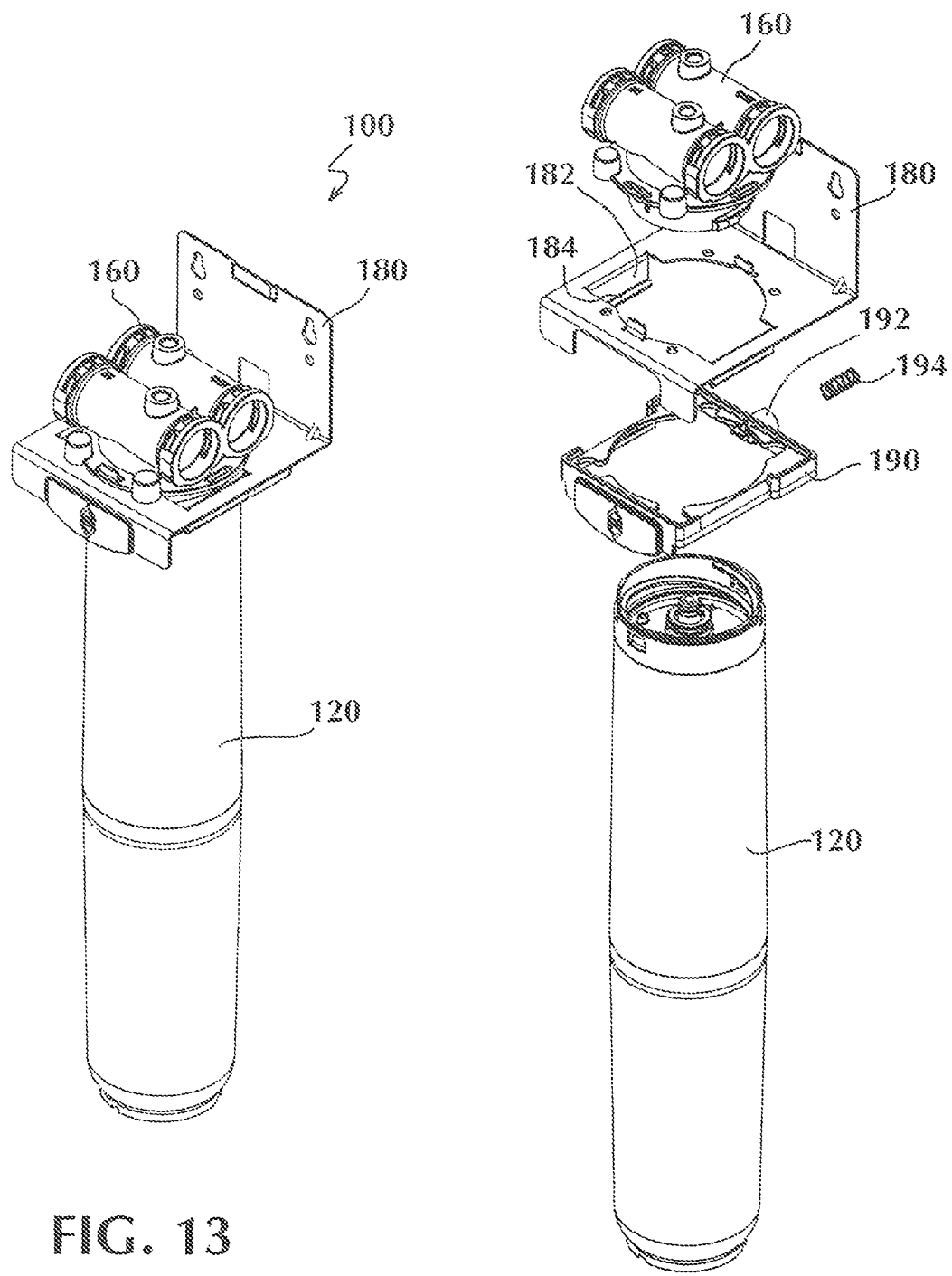
FIG. 13 depicts an alternative embodiment of a filter design supported by a bracket that includes a releasable push bar latching design.
FIG. 14 is an exploded view of the alternative filter design of FIG. 13.

FIG. 13 depicts an alternative embodiment of a filter design 100 supported by a bracket 180 that includes a releasable push bar latching design. Manifold 160 is secured to bracket 180 and includes a mating scheme for attaching filter cartridge assembly 120.

FIG. 14 is an exploded view of the alternative filter design 100 of FIG. 13. Bracket 180 includes a support brace for holding a push bar carriage 190. The support brace is preferably a downward extending ledge 182 with a horizontally extending rail 184, forming an L-shaped structure, which together with an opposing facing ledge, receives slideably push bar carriage 190. Ledge 182 is preferably integral with bracket 180. Ledges 182 create sliding surfaces via the extending rails for push bar carriage 190 to traverse back and forth. Other support brace shapes may be employed to receive slideably the push bar carriage.

Figure 15:
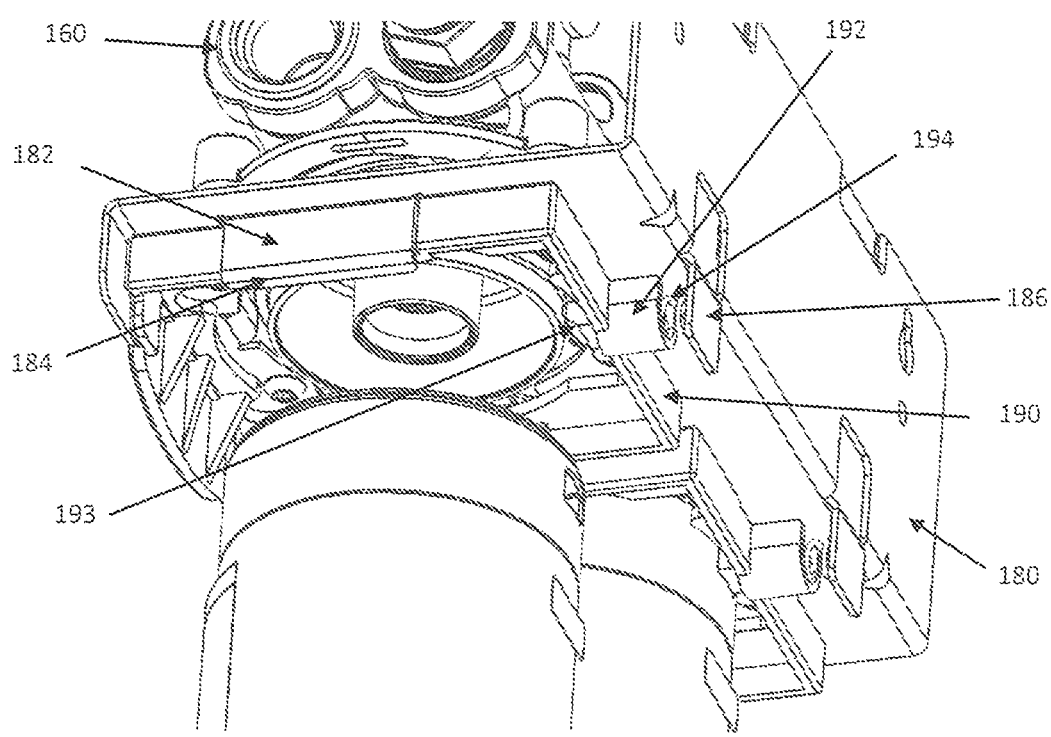
FIG. 15 is a perspective view of a push bar carriage slideably inserted within extended opposing ledges of a support bracket.

FIG. 15 is a perspective view of push bar carriage 190 slideably inserted within opposing ledges 182. Push bar carriage 190 allows the filter cartridge assembly 120 to mate with manifold head 160, and provides a locking mechanism to secure the filter cartridge assembly from further rotation when an outward extraction force acts on push bar carriage 190. A tab 186 is depicted extending downward from the horizontal shelf of bracket 180 in order to provide a bracket surface capable of withstanding the force of a resilient member 194 contained by push bar carriage 190. Conversely, the resilient member 194 may reside with the support bracket, and push bar carriage 190 may provide a surface for a withstanding force.

Figure 16B:
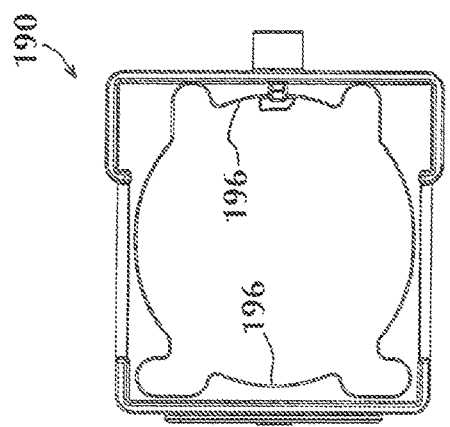
FIG. 16B is a top view of the push bar carriage of FIG. 15.
Figure 16A:
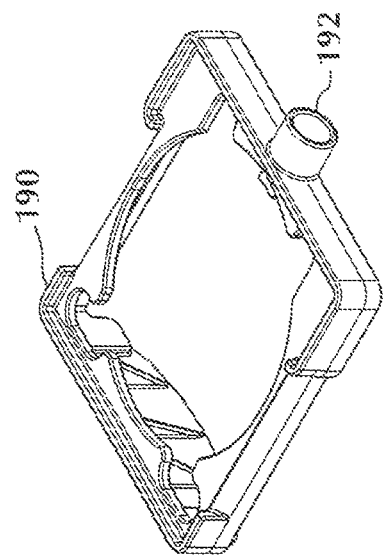
FIG. 16A is a perspective rear or back view of the push bar carriage of FIG. 15.

FIG. 16A is a perspective back view of push bar carriage 190. A retainer 192 is depicted extending from the back end of push bar carriage 190. Retainer 192 is designed to hold resilient member 194, such as a spring or other resilient component, which is capable of providing an extension force that pushes push bar carriage 190 outwards or away from tab 186 of bracket 180. The resilient component may also be integral with the push bar carriage and not require a retainer. As discussed above, tab 186 provides a bracket surface for opposing the spring force of resilient member 194. Retainer 192 may be cylindrically shaped as shown, or may be any configured shape that can hold a resilient component; for example, in FIG. 15, retainer 192 is depicted as being U-shaped. Opposite retainer 192, extending radially inwards towards the aperture of push bar carriage 190 that receives filter cartridge assembly 120, is a projection or lead-in tab 193 which moves with the extension of resilient member 194 towards the attached filter cartridge assembly. Lead-in tab 193 secures the filter cartridge assembly by its insertion within a recess 330 of annular collar 320.

Figure 16C:
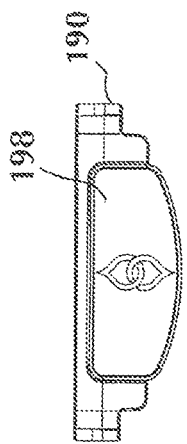
FIG. 16C depicts a front view of the push bar carriage of FIG. 15 exhibiting a wider, user-friendly front surface for a user to contact.

FIG. 16B is a top view of push bar carriage 190. As shown, push bar carriage 190 may include arcuate segments 196 forming predominantly a circular aperture to receive annular collar 320. Push bar carriage 190 may alternatively have a complete circular aperture having a diameter slightly greater than that of the annular collar 320. FIG. 16C depicts a front view of push bar carriage 190 having a wider, user-friendly front surface 198 for a user to push.

Figure 17:
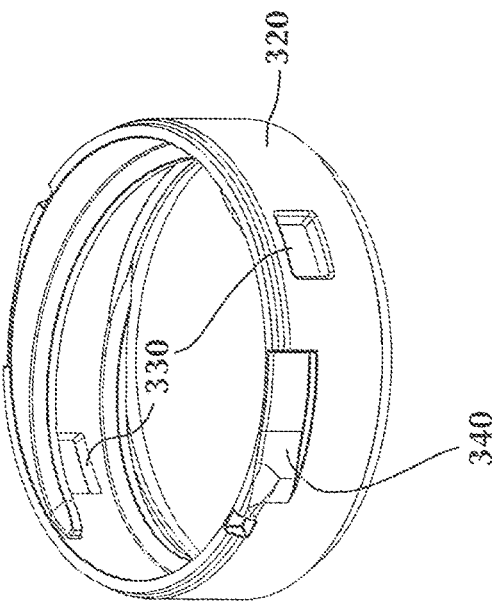
FIG. 17 depicts an annular collar for use with the push bar carriage of FIG. 15.

FIG. 17 depicts annular collar 320 for use with push bar carriage 190. Annular collar 320 includes at least one aperture or recessed indent 330, and preferably diametrically opposing apertures and/or recess indents for accepting lead-in tab 193 upon final rotation of the filter cartridge assembly into the manifold. Resilient component 194 pushes push bar carriage 190 towards the filter cartridge annular collar 320, which in turn extends lead-in tab 193 into aperture or recess indent 330. In order to release the filter cartridge assembly and provide an extracting rotation, a user pushes the push bar carriage 190 towards the backend of support bracket 180 (away from the user), which pushes lead-in tab 193 out of aperture or recess indent 330, allowing the filter cartridge assembly to be rotated.

Annular collar 320 further includes an alignment indent 340 which is designed to align with the arcuate segment 196 located at the backend of push bar carriage 190; that is, located at the end furthest from the user. Alignment indent 340 allows a user to insert vertically upwards the filter cartridge assembly past arcuate segment 196 located at the backend of push bar carriage 190 without the need to push simultaneously inwards the push bar carriage. Alignment indent 340 removes a portion of the circumferential outer surface of the annular collar 320 to provide for a straight, vertically upwards insertion of the filter cartridge assembly towards the manifold head.

The methods of attachment and extraction of a filter cartridge assembly are predicated on the locking mechanism utilized. In one embodiment, a locking ring is retained about the outer circumference of the annular collar. The locking ring includes an insertion segment, which is user operable by a resilient arcuate lock/release lever. The insertion segment is designed to enter a recess on the annular collar of the filter cartridge assembly and a recess on the manifold threaded portion upon final rotation of the filter cartridge assembly. To release, the resilient arcuate lock/release lever is pulled back by the user, and the filter cartridge assembly is rotated.

In another embodiment, a push bar carriage is utilized as the locking mechanism. To attach the filter cartridge assembly, the filter cartridge housing is aligned with the push bar carriage such that a recessed portion on the annular collar of the filter cartridge assembly lines up with the back curved portion of the push bar carriage aperture, which may be a radially extending arcuate segment. The filter cartridge assembly is inserted vertically upwards into the push bar carriage aperture and rotated within the complementary manifold receiving threaded portion. Upon final rotation, a recess in the annular collar of the filter cartridge assembly receives a tab responsive to the resilient radially inwards force of the push bar carriage. The tab secures the filter cartridge assembly from further rotation.

While the present invention has been particularly described, in conjunction with a specific preferred embodiment, it is evident that many alternatives, modifications and variations will be apparent to those skilled in the art in light of the foregoing description. It is therefore contemplated that the appended claims will embrace any such alternatives, modifications and variations as falling within the true scope and spirit of the present invention.

Thus, having described the invention, what is claimed is:

1. A modular filtration system comprising:
   at least one modular filter assembly having a manifold head and a filter cartridge assembly;
   said filter cartridge assembly including:
      a filter housing sealingly containing a filter media, and having ingress and egress ports for fluid transfer, said filter housing including an annular collar for mating to said manifold head, said annular collar having a top surface and internal threads facing radially inwards, and at least one aperture therethrough positioned below said top surface and below at least a portion of said internal threads, facing radially outwards;
      a resilient protrusion or insertion segment extending radially outwards from said filter housing collar;
   said manifold head including an attachment base having a threaded annular collar, said manifold head having ingress and egress access ports in fluid communication with said filter housing ingress and egress ports, said manifold threaded annular collar having a receiving aperture which is in mechanical communication with said resilient protrusion or insertion segment of said filter housing collar when said filter cartridge assembly is secured to said manifold head, such that said filter cartridge assembly is locked in position by said resilient protrusion or insertion segment held in place by said receiving aperture; and
   a support bracket for mounting said at least one modular filter assembly.

2. The modular filtration platform system of claim 1 including at least one sensor for monitoring fluid traversing through said system, said at least one sensor capable of measuring filtration fluid parameters such as flow rate, pressure, temperature, conductivity, and/or impurity concentrations.

3. The modular filtration system of claim 2, wherein said at last one sensor includes an integrated sensor package which is integrated with said modular filtration system for managed water visible/audible indications and Wi-Fi interface.

4. The modular filtration system of claim 3 including said integrated sensor package having an A/C power with battery backup, and a display with status indicators and/or a graphic user interface.

5. The modular filtration system of claim 1 including a locking clip attachable to said filter housing collar, said locking clip forming said resilient protrusion or insertion segment which extends radially from said filter housing collar for mating with said manifold threaded annular collar receiving aperture.

6. The modular filtration system of claim 5 wherein said locking clip has a predetermined radius and is attached circumferentially about said filter housing collar.

7. The modular filtration system of claim 6 wherein said resilient protrusion or insertion segment comprises an opposing resilient arcuate lock/release lever for extracting said resilient protrusion or insertion segment by a user.

8. The modular filtration of claim 7 wherein said resilient arcuate lock/release lever in its relaxed position extends radially beyond said radius of said locking clip, such that when said locking clip is secured to said filter housing collar, said resilient protrusion or insertion segment is aligned with said manifold threaded annular collar receiving aperture, and resiliency of said arcuate lock/release lever causes said resilient protrusion or insertion segment to extend through said manifold threaded annular collar receiving aperture.

9. A filter cartridge assembly including:
   a filter housing sealingly containing a filter cartridge, and having ingress and egress ports for fluid transfer, said filter housing including a threaded collar for mating to a manifold head, wherein said threaded collar includes a recessed portion in a partial circumferential arcuate segment to facilitate insertion, positioned below a top surface of said threaded collar and below at least a portion of threads disposed on said threaded collar, facing radially outwards; and
   a resilient protrusion or insertion segment extending radially from or through said filter housing threaded collar for releasably securing said filter cartridge housing to said manifold head.

10. The filter cartridge assembly of claim 9 including a locking clip attachable to said filter housing threaded collar, said locking clip forming said resilient protrusion or insertion segment which extends radially outwards from said filter housing threaded collar for mating with a receiving aperture on said manifold head.

11. The filter cartridge assembly of claim 10 wherein said locking clip has a predetermined radius and is attached circumferentially about said filter housing threaded collar.

12. The filter cartridge assembly of claim 11 wherein said resilient protrusion or insertion segment comprises a resilient arcuate lock/release lever insertable within said manifold receiving aperture.

13. The filter cartridge assembly of claim 12 wherein said resilient protrusion or insertion segment comprises a resilient arcuate lock/release lever insertable within said manifold threaded annular collar receiving aperture, and said resilient arcuate lock/release lever in its relaxed position extends radially beyond said radius of said locking clip, such that when said locking clip is secured to said filter housing threaded collar, said resilient protrusion or insertion segment is aligned with said manifold receiving aperture, and resiliency of said arcuate lock/release lever causes said resilient protrusion or insertion segment to extend through said manifold receiving aperture.

14. A method for inserting a modular filter cartridge assembly to a manifold head, comprising:
   providing a modular filter assembly including a filter housing sealingly containing a filter media, and having ingress and egress ports for fluid transfer, said filter housing including an annular collar having a top surface and internal threads facing radially inwards, and at least one aperture therethrough positioned below said top surface and below at least a portion of said internal threads, facing radially outwards, and a resilient protrusion or insert segment extending radially outwards from said filter housing collar;
   providing the manifold head including an attachment base having a complementary threaded annular collar, said manifold head having ingress and egress access ports, said manifold threaded annular collar having a receiving aperture for mechanical communication with said resilient protrusion or insertion segment of said filter housing collar;

aligning said modular filter cartridge assembly with a push bar carriage located on a supporting bracket, such that a recessed portion on an annular collar of the modular filter cartridge assembly aligns with a back curved portion of an aperture of said push bar carriage;

inserting said modular filter cartridge assembly inserted vertically upwards into the push bar carriage aperture;

rotating said modular filter cartridge assembly into the complementary threaded annular collar of the manifold head;

aligning the resilient protrusion or insert segment on said annular collar of said modular filter cartridge assembly upon rotation; and inserting a tab from said push bar carriage within the resilient protrusion or insert segment on said annular collar of said modular filter cartridge assembly, said tab responsive to a resilient radially inwards force of said push bar carriage, to secure said modular filter cartridge assembly from further rotation.

15. A method for extracting a modular filter cartridge assembly from a manifold head, comprising:

providing a modular filtration system comprising a modular filter assembly, a manifold head, and a support bracket, said modular filter assembly including a filter housing sealingly containing a filter media, and having ingress and egress ports for fluid transfer, said filter housing including an annular collar having a top surface and internal threads facing radially inwards, and at least one aperture therethrough positioned below said top surface and below at least a portion of said internal threads, facing radially outwards, and a resilient protrusion or insert segment extending radially outwards from said filter housing collar, said manifold head including an attachment base having a complementary threaded annular collar, said manifold head having ingress and egress access ports, said manifold threaded annular collar having a receiving aperture for mechanical communication with said resilient protrusion or insertion segment of said filter housing collar;

pushing a push bar carriage, which is slideably supported on the support bracket, inwards towards said modular filter cartridge assembly to displace a tab from within said resilient protrusion or insertion segment on the annular collar of said modular filter cartridge assembly;

rotating said modular filter cartridge assembly in a rotational direction to remove said modular filter cartridge assembly from said manifold head;

releasing said push bar carriage; and removing said modular filter cartridge assembly.

* * * * *